US012212183B2

(12) United States Patent
Häfner

(10) Patent No.: US 12,212,183 B2
(45) Date of Patent: Jan. 28, 2025

(54) STATOR FOR AN ELECTRIC MOTOR

(71) Applicant: ebm-papst Mulfingen GmbH & Co. KG, Mulfingen (DE)

(72) Inventor: Jochen Häfner, Blaufelden (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 297 days.

(21) Appl. No.: 17/882,717

(22) Filed: Aug. 8, 2022

(65) Prior Publication Data

US 2023/0038547 A1    Feb. 9, 2023

(30) Foreign Application Priority Data

Aug. 9, 2021  (DE) .......................... 102021120675.8

(51) Int. Cl.
H02K 1/16    (2006.01)
(52) U.S. Cl.
CPC ...................................... H02K 1/16 (2013.01)
(58) Field of Classification Search
CPC    H02K 1/04; H02K 1/165; H02K 1/16; H02K 1/146; H02K 3/38; H02K 3/18; H02K 3/345
See application file for complete search history.

(56) References Cited

U.S. PATENT DOCUMENTS

2021/0006103 A1    1/2021  Cho et al.

FOREIGN PATENT DOCUMENTS

| JP | 2010093960 A |   | 4/2010 |
| JP | 2014230424 A | * | 12/2014 |
| WO | 2021123539 A1 |   | 6/2021 |

OTHER PUBLICATIONS

JP_2014230424_A NPL Translation (Year: 2014).*
German Search Report dated May 2, 2022.

* cited by examiner

*Primary Examiner* — Bryan R Perez
(74) *Attorney, Agent, or Firm* — Dickinson Wright PLLC

(57) ABSTRACT

A stator for an electric motor, wherein the stator has a laminated stator core which is formed from a multitude of individual teeth that can be arranged in a ring around an axis of rotation of the electric motor and interconnected in the circumferential direction, wherein each individual tooth of the plurality of individual teeth is flanked on both sides along the circumferential direction by a further individual tooth from among the plurality of individual teeth and has a connection portion for mechanically fixing the individual tooth to the individual teeth by which it is flanked, and wherein at least some of the individual teeth each have a pressing portion for elastic and/or plastic deformation and establishment of a press-fit connection between the laminated stator core and a radially inner axle, so that, upon joining of the stator to the axle, the stator can be fixed to the axle through the deformation of the pressing portions and a force acting on the axle as a result of the deformation between laminated stator core and axle.

6 Claims, 2 Drawing Sheets

STATOR FOR AN ELECTRIC MOTOR

RELATED APPLICATIONS

This application claims priority to German Patent Application No. 10 2021 120 675.8, filed Aug. 9, 2021, the entire contents of which are incorporated herein by reference in their entirety.

FIELD

The disclosure relates to a stator for an electric motor for joining to an axle of the electric motor.

BACKGROUND

Diverse variants of a stator are already known from the prior art, which, for example when the electric motor is embodied as an external rotor, must be joined to an axle.

In addition, stators consisting of a multitude of individual teeth are already known which can be joined in a form-fitting manner to the axle and, for example, by means of a respective dovetail connection. However, forces acting on the individual teeth can cause these to be separated from one another during assembly or when the stator is joined to the axle, thereby disassembling or damaging the stator. Furthermore, the form-fitting connection makes it necessary for both the individual teeth and the axle for connection to the stator to be manufactured with a high level of accuracy or low tolerance, since the components cannot otherwise be assembled with one another.

BRIEF SUMMARY

The present disclosure provides a stator which can be assembled easily and quickly and has a multitude of individual teeth.

This object is achieved by the combination of features according to claim 1.

According to the disclosure, a stator is proposed for an electric motor which is preferably embodied as an external rotor. The stator has a laminated stator core which is formed from a multitude of individual teeth that can be arranged in a ring around an axis of rotation of the electric motor and are interconnected in the circumferential direction, so that the stator or the laminated stator core is segmented into the individual teeth and can be described as a segmented stator. Each individual tooth of the plurality of individual teeth is flanked on both sides along the circumferential direction around the axis of rotation by a further individual tooth from among the plurality of individual teeth and has a connection portion for mechanically fixing the individual tooth to the two individual teeth by which it is flanked. If the electric motor is embodied as an external rotor, so that the stator is connected to an axle that is on the inside across from the stator, an external rotor of the electric motor can rotate about the axle and the stator. At least some of the individual teeth and, preferably, all of the individual teeth each have a radially inner pressing portion for elastic and/or plastic deformation and establishment of a press-fit connection between the laminated stator core and an axle of the electric motor which can be arranged so as to extend through the laminated stator core along the axis of rotation and coaxially with the axis of rotation and which can also be described as an axle element, so that, upon joining of the stator to the axle, the stator can be fixed to the axle through the deformation of the pressing portions and a force acting on the axle as a result of the deformation between laminated stator core and axle. The pressing portion is designed to be elastically and/or plastically deformed when it is joined to the axle itself, with the forces occurring and acting on the individual tooth preferably not affecting the other portions of the individual tooth and, in particular, the connection portion, or only up to a permissible limit value.

One variant of such a stator is also advantageous in which the pressing portions each have a web extending in the radial direction and at least one lever arm that is connected to the web and protrudes in the circumferential direction relative to the web with a contact surface that points inward in the radial direction for contact with the axle. The at least one lever arm, which preferably terminates the pressing portion and, more preferably, the individual tooth on a side facing toward the axle, can be deflected and deformed in the radial direction during joining, so that a pressing force can be exerted on the axle as a result of the deflection and deformation.

Furthermore, according to another advantageous embodiment of the stator, a provision can be made that the lever arms together define a sleeve-shaped pressing contour with their contact surfaces that is coaxial with the axis of rotation and oversized compared to an outer contour of the axle, so that the lever arms are pressed radially outward when joined to the axle.

Accordingly, by virtue of the deformation of the press portions, the stator can be fixed to the axle by means of a press-fit connection.

With such an elastic, plastic press-fit connection between the stator or laminated stator core and axle, a force acting on the individual teeth during joining in the region of the connection portions and separating the same from one another can be limited by local deformation that is restricted to the pressing portions, thus enabling damage to the laminated stator core due to separation of the individual teeth to be prevented. Furthermore, tolerance compensation is made possible solely by the pressing portions, more particularly by the deformation of the pressing portions, resulting in fewer high manufacturing requirements for the axle. Accordingly, the axle can also be variable with regard to its respective pressing contour, so that no other laminated stator cores or individual teeth need to be manufactured within the region that can be compensated for by the pressing portions for different axles. Nor does the laminated stator core require cleaning in order to be joined to the axle, since contamination is compensated for by the press-fit connection or taken into account by the tolerance.

Since the lever arms are at least partially elastically deformed even with plastic deformation, they also act as springs, so that they can also be referred to as spring arms that exert a resilient force on the axle during or after joining.

Moreover, a provision can be advantageously made that the contact surfaces of the lever arms are concave. Due to their arrangement relative to one another, it is possible for both the contact surfaces of the lever arms to each be concave and for the contact surfaces of the lever arms of a pressing portion to be concave.

Furthermore, in another advantageous embodiment, the pressing portions can each have two lever arms that protrude in the circumferential direction relative to the web for contact with the axle, which lever arms are situated opposite one another and protrude in opposite directions relative to the web.

In order to ensure independent deflection and deformation of the two lever arms, at least one groove that decouples the lever arms from one another or a free space that decouples the lever arms can be formed on the pressing portions between the two lever arms and separate the lever arms from one another so that they can be deflected and deformed independently of one another.

The web can extend from the pressing portion to the connection portion of the respective individual tooth.

Preferably, the lever arms are each connected to the web via a connection portion that is instantiated particularly as a taper by means of which a force acting during joining can be predetermined. For example, the necessary and/or maximum force for deflecting the respective lever arm can be determined by a thickness or general geometric configuration of the connection portion, so that a force can be set in a targeted manner which is required to move the lever arm from a basic position before joining with the axle to move into a pressing position after joining with the axle.

Furthermore, the lever arms preferably have a free end on a side opposite the respective connection portion so that they can be resiliently or elastically held by the connection portion on the web and plastically deformed or deflected in the radial direction at the end of an elastic region.

In order to further protect the stator from unwanted disassembly when it is joined to the axle, i.e., separation of the individual teeth or breaking of the mechanical connection produced by the connection portions, an advantageous further development makes a provision that the pressing portions are embodied such that, due to the deformation of the pressing portions, a force acting on the connection portions and separating the individual teeth from one another is smaller during joining than a maximum permissible force on the connection portions, so that the individual teeth do not separate during joining. This enables the force to be adjusted, for example through appropriate designing of the pressing portions or, for example, of the connection portions.

In order to enable simple centering to be performed during joining, i.e., when pressing the axle into the laminated stator core, insertion bevels on which the axle can be guided into the laminated stator core along the axis of rotation can be provided on the pressing portions and particularly on the lever arms.

Alternatively, such insertion bevels can also be provided on the axle.

Another aspect of the disclosure relates to an electric motor with such a stator according to the disclosure.

The features disclosed above can be combined as required, provided this is technically possible and they do not contradict one another.

BRIEF DESCRIPTION OF THE DRAWINGS

Other advantageous refinements of the disclosure are characterized in the subclaims and/or depicted in greater detail below together with the description of the preferred embodiment of the disclosure with reference to the figures. In the drawings:

DETAILED DESCRIPTION

The figures are schematic examples. Same reference symbols in the figures indicate same functional and/or structural features.

Figure 1:
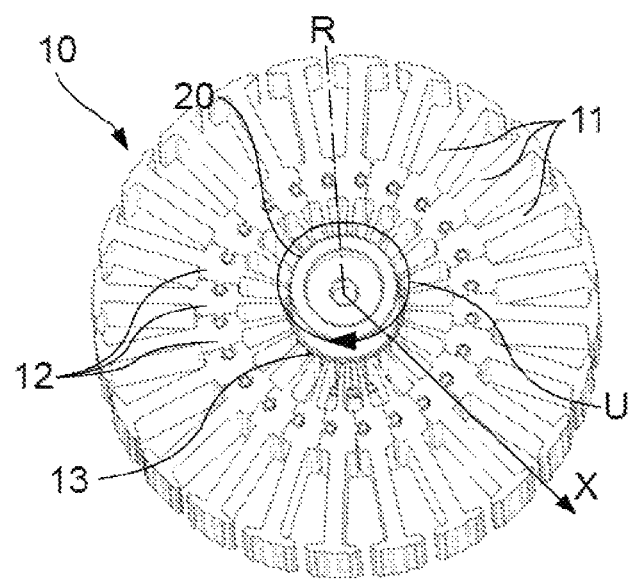
FIG. 1 shows a perspective representation of a laminated stator core joined to an axle.

FIG. 1 shows a perspective view of a laminated stator core 10 joined to an axle 20. If, as is the case here, a laminated stator core 10 is formed from a multitude of individual teeth 11 that are interconnected in the circumferential direction U, it is possible during joining of the laminated stator core 10 to the axle 20 for impermissibly high forces to occur in the region of the connection portions 12 by which the Individual teeth 11 are mechanically interconnected or fixed to one another in the circumferential direction U, resulting in the release of the mechanical connection and separation of the individual teeth 11 from one another and thereby dismantling or even damaging the laminated stator core.

Figure 2:
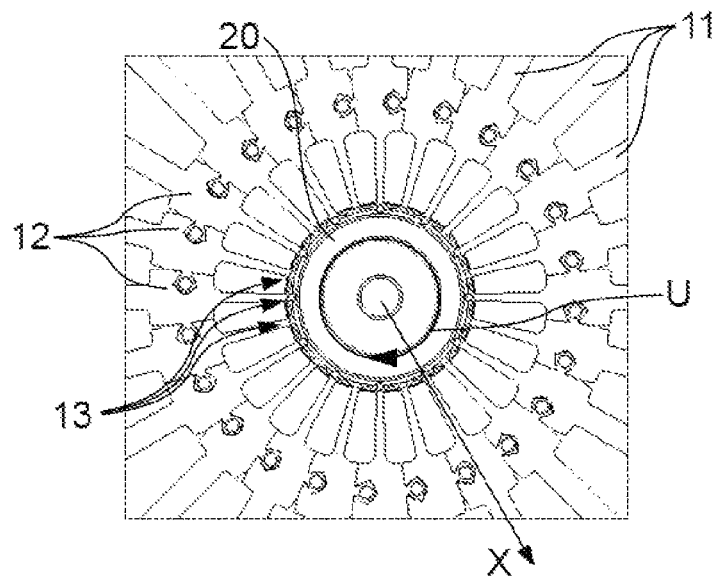
FIG. 2 shows detail from a plan view of a laminated stator core joined to an axle.
Figure 3:
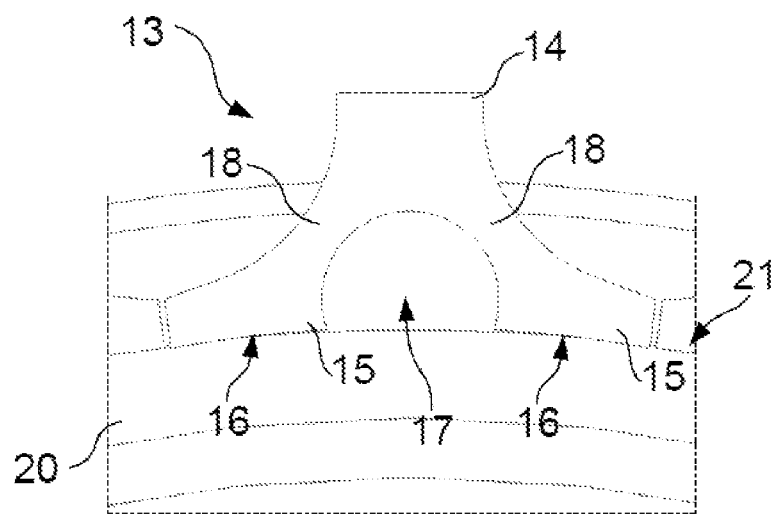
FIG. 3 shows a pressing portion of a single tooth of a laminated stator core joined to an axle.

In order to prevent such dismantling or damage to the laminated stator core 10, at least some of the individual teeth 11 and—especially preferably, as shown in FIGS. 1 to 3—all of the individual teeth 11 have a pressing portion 13 that is designed to join the laminated stator core 10 to the axle 20.

The pressing portion 13 is located radially to the axis of rotation R about which a rotor of the electric motor can rotate around the stator, on the inside, and closes off the individual teeth 11 in the radial direction X inward or toward the axle 20.

FIG. 2 corresponds to detail of a plan view of the laminated stator core 10 with the axle 20 joined thereto, as illustrated by FIG. 1. This makes it particularly clear that the laminated stator core 10 is in contact with the axle 20 exclusively through the pressing portions 13 of the individual teeth 11 of the laminated stator core 10, and that the pressing portions 13 of the individual teeth 11 together define a sleeve-shaped pressing contour that corresponds to the outer contour of the axle 20 but is oversized relative thereto. Due to the oversize, the axle 20 can be arranged in and pressed into the pressing contour formed by the pressing portions 13, so that a deformation of the pressing portions 13 or a deformation of the lever arms 15 of the pressing portions 13 shown in FIG. 3 occurs during the pressing-in, whereby the lever arms 15 are pressed radially outward and exert a pressing force on the axle 20.

FIG. 3 shows an enlarged view of a single pressing portion 13, making it clear that the pressing portion 13 is terminated radially inward by two lever arms 15 which are separated from one another by a weakening or a groove 17, but each of which is connected to the web 14 by means of a taper or a connection portion 18.

The connection portions 18 and the groove 17 enable the lever arms 15 to be deflected independently of one another, with these each having a free end opposite their end that merges into the connection portion 18, so that when they are joined to the axle 20, they initially yield elastically and can be plastically deformed preferably at the end of the elastic deformation.

The lever arms 15 each have a contact surface 16 for contact with the axle 20, with each of the contact surfaces 16 or the two contact surfaces 16 of the pressing portion 13 together describing a concave shape or possibly being concave. The two contact surfaces 16 provide two contact regions or contact points for each pressing portion via which the respective individual tooth 11 rests against the axle 20.

In order to prevent the individual teeth 11 that are interconnected at the connection portions 12 from being separated from one another when the axle 20 is joined, i.e., pressed into the stator or into the pressing contour formed by the pressing portions 13, the connection portions 18 are embodied such that, during joining and an associated deflection of the lever arms 15 at the connection portions 12, a force acts which is smaller than a maximum permissible force by which the individual teeth 11 at the connection portions 12 would be separated from one another.

The disclosure is not limited in its execution to the abovementioned preferred exemplary embodiments. Rather, a number of variants are conceivable that make use of the illustrated solution even in the form of fundamentally different embodiments.

The invention claimed is:

1. A stator for an electric motor having an axle (20), the stator comprising:
   a laminated stator core (10) which is formed from a plurality of individual teeth (11) arranged in a ring around an axis of rotation (R) of the electric motor and interconnected in the circumferential direction (U),
   wherein each individual tooth (11) of the plurality of individual teeth is flanked on both sides along the circumferential direction (U) by a further individual tooth (11) from among the plurality of individual teeth (11) and has a connection portion (12) for mechanically fixing the individual tooth (11) to the individual teeth (11) by which it is flanked,
   wherein at least some of the plurality of individual teeth (11) each have a radially inner pressing portion (13) for elastic and/or plastic deformation and establishment of a press-fit connection between the laminated stator core (10) and an axle (20) of the electric motor configured so as to extend through the laminated stator core (10) along the axis of rotation (R) and coaxially with the axis of rotation (R), so that, upon joining of the stator to the axle (20), the stator can be fixed to the axle (20) through the deformation of the pressing portions (13) and a force acting on the axle (20) as a result of the deformation between laminated stator core (10) and axle (20),
   wherein the pressing portions (13) each have a web (14) extending in the radial direction (X) and at least one lever arm (15) that is connected to the web (14) and protrudes in the circumferential direction (U) relative to the web (14) with a contact surface (16) that points inward in the radial direction (X) for contact with the axle (20), and
   wherein the pressing portions (13) each have two lever arms (15) which protrude in the circumferential direction relative to the web (14), which lever arms (15) are situated opposite one another and protrude in opposite directions relative to the web (14), wherein at least one groove (17) is respectively formed on the pressing portions (13) between the two lever arms (15) which decouples the lever arms (15) from one another and separates the lever arms (15) from one another so that they can be deflected and deformed independently of one another, and wherein at least one lever arm (15) can be deflected and deformed in the radial direction (X) during joining, so that a pressing force can be exerted on the axle (20) as a result of the deflection and deformation.

2. The stator as set forth in claim 1,
   wherein the lever arms (15) together define a sleeve-shaped pressing contour with their contact surfaces (16) that is coaxial with the axis of rotation (R) and oversized compared to an outer contour (21) of the axle (20), so that the lever arms (15) are pressed radially outward when joined to the axle (20).

3. The stator as set forth in claim 1,
   wherein the contact surfaces (16) of the lever arms (15) are concave.

4. The stator as set forth in claim 1,
   wherein the lever arms (15) are each connected to the web (14) via a connection portion (18) that is instantiated particularly as a taper by means of which a force acting during joining can be predetermined.

5. The stator as set forth in claim 1,
   wherein the pressing portions (13) are embodied such that, due to the deformation of the pressing portions (13), a force acting on the connection portions (12) and separating the individual teeth (11) from one another is smaller during joining than a maximum permissible force, so that the individual teeth (11) do not separate during joining.

6. An electric motor with a stator as set forth in claim 1.

* * * * *